H. L. HOPKINS.
PITMAN JOINT FOR MOWING MACHINES.
APPLICATION FILED APR. 21, 1916. RENEWED JULY 12, 1916.
1,215,805.
Patented Feb. 13, 1917.
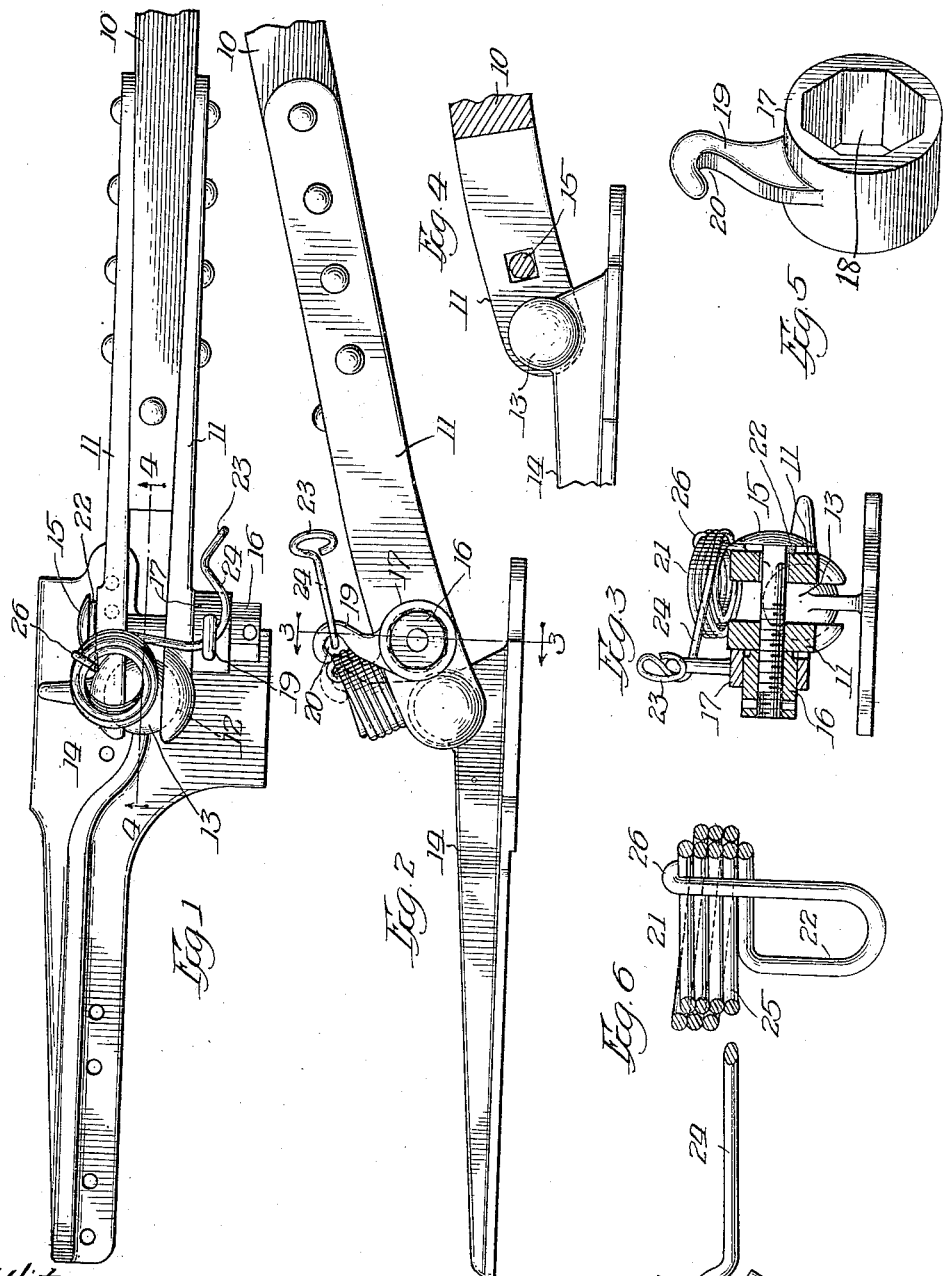

UNITED STATES PATENT OFFICE.

HARVEY L. HOPKINS, OF CHICAGO, ILLINOIS, ASSIGNOR TO JOHN HOWARD McELROY, OF CHICAGO, ILLINOIS.

PITMAN-JOINT FOR MOWING-MACHINES.

1,215,805.    Specification of Letters Patent.    Patented Feb. 13, 1917.

Application filed April 21, 1913, Serial No. 762,496.    Renewed July 12, 1916.    Serial No. 108,959.

*To all whom it may concern:*

Be it known that I, HARVEY L. HOPKINS, a citizen of the United States, and a resident of Chicago, in the county of Cook and State of Illinois, have invented certain new and useful Improvements in Pitman-Joints for Mowing-Machines, of which the following is a full, clear, and exact specification.

My invention is concerned with certain novel pitman connections designed primarily for use upon mowing machines and cutting apparatus of that general character to connect the pitman to the sickle, but which is capable of use elsewhere, if desired.

In devices of this general character, a joint is formed by drawing two arms having opposed bearing faces upon a bearing member located between said faces, by tightening a nut upon a bolt passing through said arms adjacent the bearing member, and heretofore the nut was merely tightened by hand, and some spring or other lock-out mechanism was employed merely to prevent the nut from turning backward so as to loosen the joint.

In my invention, I apply a spring to an adjustable wrench-arm on the nut, so that, instead of the spring merely holding the nut from turning in either direction, it always tends to turn the nut in the proper direction to take up the wear and keep the joint as it should be, or to tighten it up properly if it was originally adjusted too loosely.

To illustrate my invention, I annex hereto a sheet of drawings, in which the same reference characters are used to designate identical parts in all the figures, of which—

Figure 1 is a top plan view of the lower end of a pitman rod having my invention applied thereto;

Fig. 2 is a side elevation of the same;

Fig. 3 is a vertical section on the line 3—3 of Fig. 2;

Fig. 4 is a section on the line 4—4 of Fig. 1, with the spring omitted;

Fig. 5 is a perspective view of the wrench-arm detached, on an enlarged scale; and Fig. 6 is a sectional view through the spring, on an enlarged scale.

In carrying out my invention as applied to the pitmen of mowing machines, I may employ the customary wooden bar 10 having a pair of arms 11 riveted to the lower end, these arms being provided at their lower ends with opposed, concave bearing surfaces 12 adapted to coöperate with the ball 13 formed on the knife-head 14 in the customary manner. A bolt 15 has the squared portion adjacent the head fitting in a square aperture in one of the arms 11, and the nut 16 is screwed on the threaded end of the bolt outside of the other arm, so that when the nut is tightened the bearing surfaces will be drawn upon the ball 13 to produce the desired degree of friction in the ball and socket joint thus formed. The elements thus far described are of the customary construction, and, prior to my invention, various schemes have been employed to coöperate with the nut 16 to prevent its turning after it has been adjusted.

In Fig. 1, I have shown my invention as applied to the joint at the lower end of the pitman rod, and the nut 16 in this case I preferably make octagonal, and upon this nut I place the wrench-arm 17, which will be seen to consist of the body portion 18 provided with an aperture corresponding to the shape of the nut 16, so as to fit rather snugly thereon, and with a short arm 19 provided with a recess or hook 20. A spring 21, of a strength and weight to fit it for the particular use to which the joint is put, is preferably secured at one end to the pitman by having formed near said end a loop 22 which is adapted to fit between the head of the bolt 15 and the adjacent arm 11. The other end of the spring is provided with a thumb-piece 23, which may be formed as a circular loop, and with a curved engaging portion 24 adjacent said end, which portion is adapted to coöperate with the recess 20 in the wrench-arm 17. Between the loop 22 and the engaging portion 24, I form as many coils 25 as may be necessary to secure the desired resiliency. I have illustrated seven coils as going to make up the working portion of the spring. The end of the spring beyond the loop 22 preferably passes up through the coils adjacent one edge and has a hook 26 thereon coöperating with the coils to hold the parts in the proper relationship.

In using this invention, when the farmer puts the knife in place, after grinding it, the nut 16 is turned up by hand, and finally by the use of the wrench-arm 17, until it is as tight as may be desired, but it will be noted that by the use of this short wrench-arm, it is practically impossible for the farmer to tighten it up too much. The wrench-arm is then adjusted on the nut with the arm 19 projecting forwardly, say in the dotted-line position shown in Fig. 2. The end loop 23 is then seized and swung around against the resistance of the spring until the bearing portion 24 catches in the recess 20, after which the tension of the spring tends to turn the arm, and consequently the nut, sufficiently to take up the looseness, whether the same results from too loose an adjustment to start with or from wear. The knife is then ready for use. If it is not tightened up sufficiently to start with to make the joint firm, the tension of the spring as the machine starts will serve to swing the wrench-arm 17 far enough to turn the nut to tighten up the joint. Any wear that may occur before the knife is removed will be taken up unfailingly by the action of the spring.

While I have shown and described my invention as embodied in the form which I at present consider best adapted to carry out its purposes, it will be understood that it is capable of modifications,—such, for instance, as are shown in my application No. 728,570, filed October 30, 1912, wherein another form of spring is shown and claimed specifically—and that I do not desire to be limited in the interpretation of the following claims except as may be necessitated by the state of the prior art.

What I claim as new, and desire to secure by Letters Patent of the United States, is:

1. In a device of the class described, the combination with a rod and a pair of arms secured thereto provided with opposed bearing faces, of a bearing member between said faces and coöperating therewith to form a joint, a bolt passing through said arms adjacent the bearing faces and held from turning therein, a nut on the bolt, a wrench-arm on the nut, and a spring acting on the arm and tending to turn the nut to tighten the joint.

2. In a device of the class described, the combination with a rod and a pair of arms secured thereto provided with opposed bearing faces, of a bearing member between said faces and coöperating therewith to form a joint, a bolt passing through said arms adjacent the bearing faces and held from turning therein, a nut on the bolt, a wrench-arm on the nut, and a coiled expanding spring secured at one end to the rod member and at the other end to the wrench-arm so that the latter tends to turn to tighten the nut.

3. In a device of the class described, the combination with a rod and a pair of arms secured thereto provided with opposed bearing faces, of a bearing member between said faces and coöperating therewith to form a joint, a bolt passing through said arms adjacent the bearing faces and held from turning therein, a nut on the bolt, a wrench-arm on the nut, and a spring consisting of a loop through which the bolt passes, a portion adapted to engage the crank-arm, and a plurality of coils connecting the loop and the engaging portion and serving to turn the wrench-arm.

In witness whereof, I have hereunto set my hand and affixed my seal, this 19th day of April, A. D. 1913.

HARVEY L. HOPKINS. [L. S.]

Witnesses:
JOHN HOWARD McELROY,
MILDRED ELSNER.

Copies of this patent may be obtained for five cents each, by addressing the "Commissioner of Patents, Washington, D. C."